United States Patent [19]
Hsu et al.

[11] Patent Number: 5,864,294
[45] Date of Patent: Jan. 26, 1999

[54] METHOD AND DEVICE FOR EXPANDING COMPUTER FUNCTION

[75] Inventors: Shih-Chung Hsu; Wei-Chia Chao; Chien-An Chen, all of Taipei, Taiwan

[73] Assignee: Acer, Inc., Taipei, Taiwan

[21] Appl. No.: 626,682

[22] Filed: Apr. 1, 1996

[51] Int. Cl.[6] .............................. G08B 21/00; H05K 5/00
[52] U.S. Cl. ........................ 340/635; 361/683; 361/686
[58] Field of Search .................................. 340/635, 636; 395/281, 283, 325; 361/683, 686, 688; 364/708.1, DIG. 1

[56] References Cited

U.S. PATENT DOCUMENTS

| | | | |
|---|---|---|---|
| 5,313,596 | 5/1994 | Swindler et al. | 395/325 |
| 5,323,291 | 6/1994 | Boyle et al. | 361/683 |
| 5,347,425 | 9/1994 | Herron et al. | 361/683 |
| 5,463,742 | 10/1995 | Kabayashi | 395/281 |
| 5,526,493 | 6/1996 | Shu | 395/281 |
| 5,535,093 | 7/1996 | Noguchi et al. | 361/686 |
| 5,550,710 | 8/1996 | Rahamin et al. | 361/687 |
| 5,552,959 | 9/1996 | Penninman et al. | 361/686 |
| 5,619,398 | 4/1997 | Harrison et al. | 361/686 |

*Primary Examiner*—Jeffery A. Hofsass
*Assistant Examiner*—Van T. Trieu
*Attorney, Agent, or Firm*—Townsend and Townsend and Crew LLP

[57] ABSTRACT

The present invention provides a docking station, a docking station system, and a method of coupling a personal computer, typically a palm top, notepad, or ideally a notebook computer, with such a computer docking station. The computer is typically manually positioned and securely held in place within a computer receptacle of the docking station. Generally, the computer will include an LED (or other signal generator) which indicates the operating mode of the computer, typically indicating at least one of off, on, or suspense mode. The docking station thereby senses whether it is appropriate to engage a docking station connector to a computer connector based on the computer operating mode. Typically, the connection will be made if the computer is either off or in the suspense mode. When connection is appropriate, the docking station connector is automatically translated to engage the computer connector of the fixed notebook computer.

36 Claims, 4 Drawing Sheets

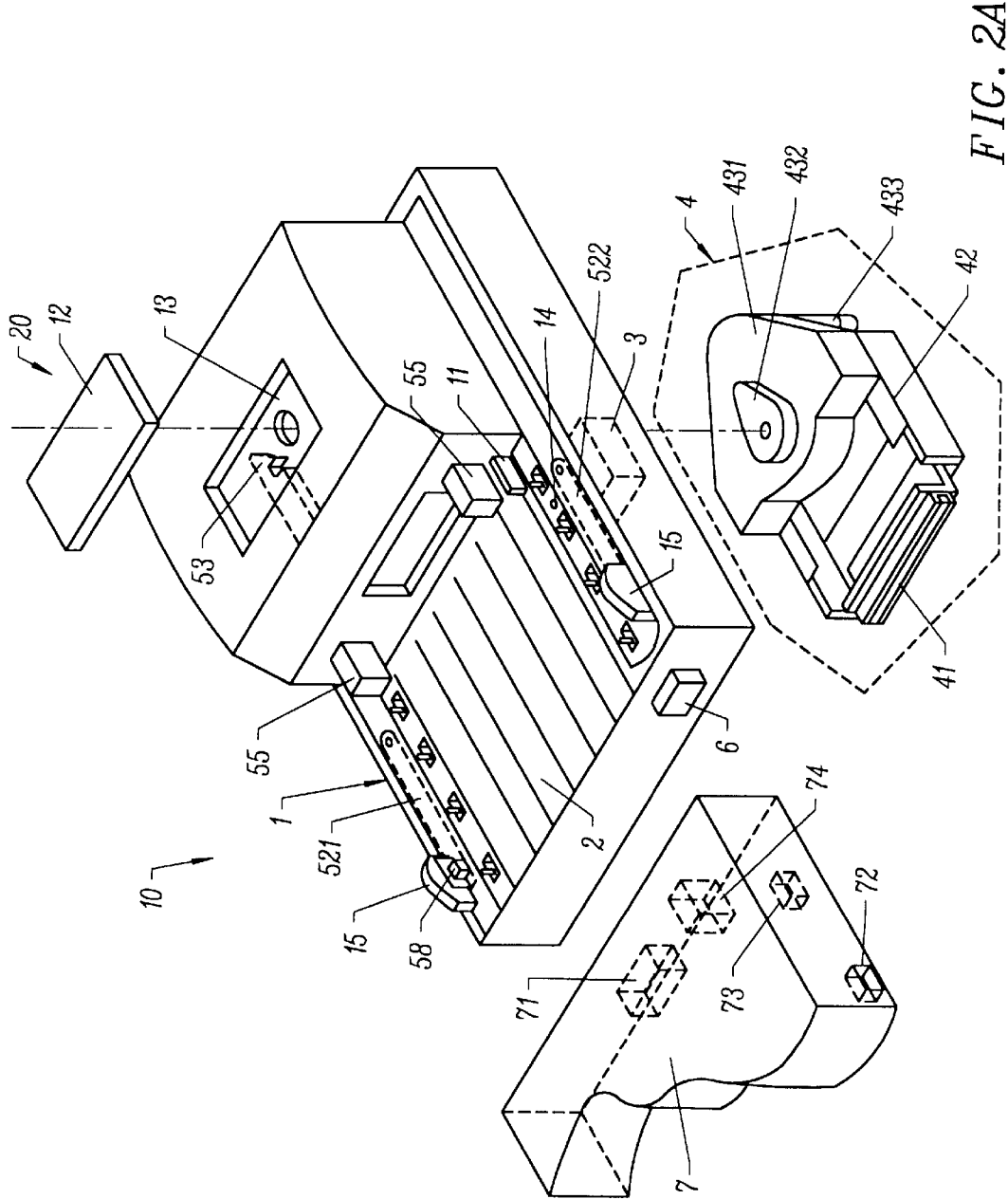

5,864,294

METHOD AND DEVICE FOR EXPANDING COMPUTER FUNCTION

CROSS-REFERENCE TO RELATED APPLICATION

This application is a continuation of Provisional U.S. patent application Ser. No. 60/006,781, filed Nov. 15, 1995, now abandoned and is a continuation-in-part of Provisional U.S. patent application Ser. No. 60/005,456, filed Oct. 16, 1995, now abandoned the full disclosures of which are incorporated herein by reference.

FIELD OF THE INVENTION

The present invention is generally related to a method and a device used to expand the function of a personal computer, and more particularly, provides a computer docking station system having a computer operation mode sensor and a translating interface connector.

BACKGROUND OF THE INVENTION

The use of docking stations for increasing the capabilities of notebook computers is known. Docking stations increase notebook computer functionality by providing additional expansion boards, slots, and bays, and by accepting additional input/output connectors for related peripheral equipment wherever the notebook is to be used in a fixed office environment. The docking station provides these increased capabilities only in the office, and thus avoids increasing the size or weight of the undocked notebook computer. Docking stations thereby promote the use of a single processor for both fixed and mobile operation.

Unfortunately, docking stations now available often require that the notebook computer be completely shut-down prior to "docking" (expansion of the computers capabilities by interconnection with the docking station). Additionally, existing docking stations often do not have "plug-and-play" capabilities, instead requiring re-booting (and possibly even reconfiguration) of the notebook computer software to enable the computer to recognize and utilize the expansion equipment. Such complete shut-down and re-booting of the notebook interrupts any computing work in progress, compromising the convenience and expanded functionality of the docking station/notebook computer system.

Expansion of computer functionality does not always require complete shut-down and re-booting. For example, plug-and-play is common for connection of peripherals with today's mainframe computer systems. In fact, certain notebook computer docking station systems are available with limited plug-and-play capabilities, such as Apple's Duo Docking Station™, and Compaq's Smart Station™. While these known docking station systems do overcome some of the limitations described above, they suffer from another related problem: they rely on complex, expensive, and difficult to maintain notebook computer loading systems.

Existing computer docking systems which allow docking of the notebook computer without a full shut-down of the computer rely on a "VCR-like" loading system. Specifically, the computers are loaded into the docking stations using electromechanical manipulation of the entire notebook computer to bring the connectors of the notebook into engagement with the connectors of the docking station. Although analogous systems have proven effective for loading VCR tapes into VCR's, such an approach has serious drawbacks when adapted for use in notebook computer docking station systems.

Notebook computers are generally both heavier and more delicate than VCR tapes, requiring a powerful, complex, and expensive loader mechanism to accurately and safely load the computer. This loader will require a considerable power supply, compounding these costs for both users and manufacturers. In addition, due to their complexity, such loaders tend to break down, are difficult and expensive to repair, and result in significant reliability and maintenance problems for docking system users.

For these reasons, it would be desirable to provide improved computer docking stations and methods which do not require complete shut-down and/or re-booting of a notebook computer during docking. It would be especially advantageous if such devices and methods provided the safety and convenience of a VCR-type power loader, but without resorting to the complex and costly machinery used to load notebook computers into known plug-and-play docking stations.

SUMMARY OF THE INVENTION

The docking station system and method of the present invention promote coupling of a personal computer, typically a palm top, a notepad, or ideally a notebook computer, with a computer docking station. The computer is generally manually positioned within a computer receptacle of the docking station, where it is securely held in place. The computer will often include an LED (or other signal generator) which indicates the operating mode of the computer, typically indicating at least one of off, on, or a suspense operating mode. The docking station thereby senses whether it is appropriate to engage a docking station connector to a computer connector based on the computer operating mode. Typically, the connection will be made if the computer is either off or in the suspense mode. When connection is appropriate, the docking station connector is automatically translated from a retracted position within the docking station to engage the computer connector of the fixed notebook computer.

Such translation of a docking station connector provides a substantial decrease in mechanical complexity and power requirements as compared to VCR-type translation of an entire notebook computer. Furthermore, the mode sensor system allows the computer to be positioned in the receptacle regardless of its operating mode, and also facilitates connection with the docking station when the computer is in the suspense mode, thereby avoiding any requirement that the notebook computer be fully shut-down and re-booted.

In a first aspect, the present invention comprises a computer docking station for use with a computer having a first connector, the docking station comprising a housing having a computer receptacle and a second connector. The second connector is movable between a first position and a second position. When the computer is within the receptacle and the second connector is at the first position, the second connector is disengaged from the first connector. However, when the second connector is at the second position it engages the first connector, allowing translation of the second connector relative to the fixed computer to provide a safe, controlled, and accurate coupling of the computer to the docking station.

In a second aspect, the present invention provides a docking station system broadly comprising a computer and a docking station. The computer includes a first connector and an operation mode signal generator which indicates at least one of off, a normal operating mode, and a suspense operating mode of the computer.

The docking station includes a housing having a computer receptacle which removably receives the computer, and a locking mechanism which securely holds the computer in the computer receptacle. A second connector is movable relative to the receptacle between a first position and a second position. Once again, when the computer is within the receptacle and 1) the second connector is at the first position, the second connector is disengaged from the first connector, and 2) the second connector is at the second position, it engages the first connector. Here, however, a signal receiver on the housing is capable of sensing the at least one mode from the signal generator. A drive mechanism supports the second connector and translates it between the first position and the second position if the computer is in an operating mode other than the normal operating mode.

In a final aspect, the present invention provides a method for docking a computer, the method comprising loading a computer having a first connector into a computer receptacle of a docking station. A second connector of the docking station is translated from a first position to a second position at which the second connector engages the first connector.

BRIEF DESCRIPTION OF THE DRAWINGS

FIG. 2(a) is an exploded perspective view of a docking station system according to the principles of the present invention, showing an exemplary docking station connector drive mechanism which has been enlarged for clarity.

DESCRIPTION OF THE PREFERRED EMBODIMENT

Figure 1:
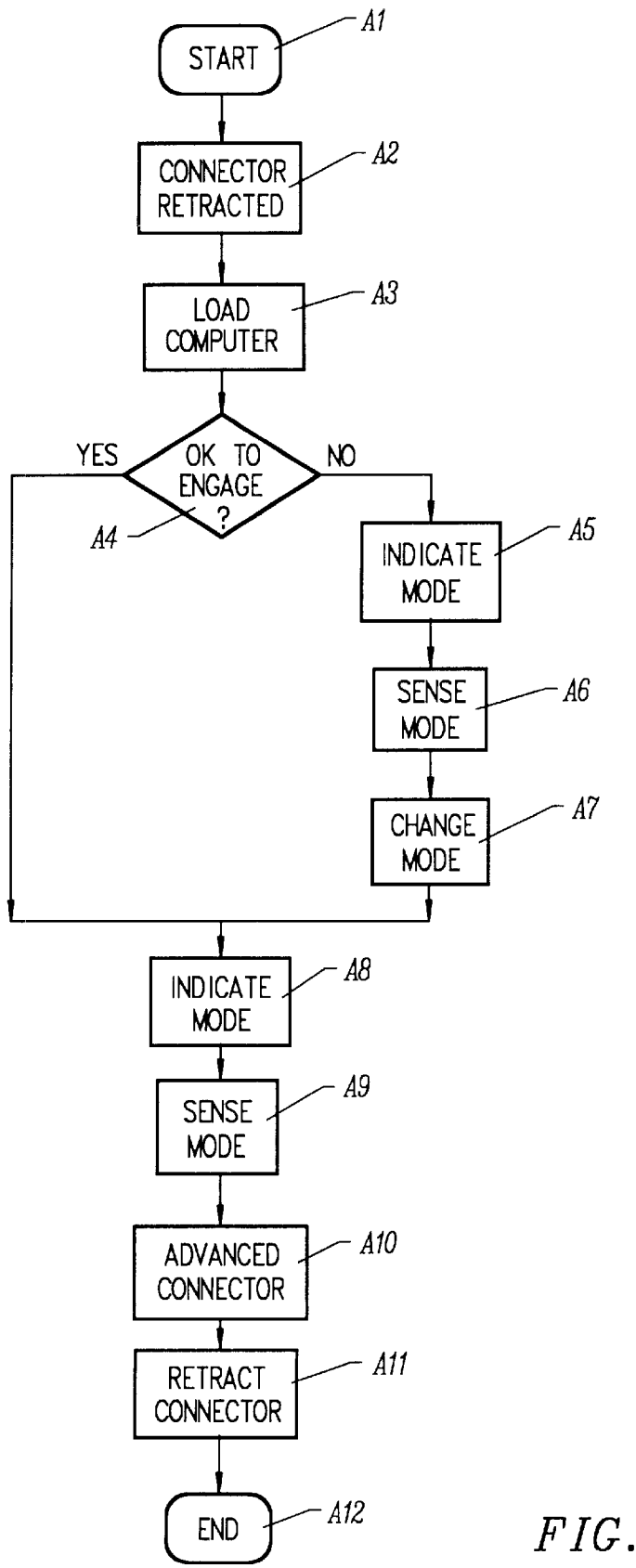
FIG. 1 is a flow chart for a computer function expansion method according to the principles of the present invention.

An exemplary procedure for expansion of the computer's functional capabilities will be described with reference to the flow chart shown in FIG. 1. After starting the loading procedure A1, the location of the docking station connector is confirmed to be at the retracted position A2 to avoid any interference with the loading of the computer. The computer, preferably a notebook computer, may then be safely loaded A3 into a computer receptacle of a docking station.

Once the computer is in place, a decision A4 whether to engage the docking station connector with the connector of the computer is made based on the operating mode of the computer. Engagement may generally proceed safely where the computer is fully shut-down. Furthermore, the present method provides that engagement may safely proceed where the computer is in a suspense (low power use) mode. Thus, the present method includes having the computer generate a signal indicating if the computer is in a normal operating mode A5. This signal is sensed by the docking station A6, so that engagement may be delayed until the computer is in another mode. This signal may, for example, comprise a light signal from an LED, the lack of such a light signal, a flashing pattern, or the like. Such an LED may indicate each operating mode, only the normal operating mode, or every mode other than the normal operating mode, any of which will supply the docking station with the required information.

Typically, the computer will be placed in the suspense mode A7 by the user, or the computer may alternatively enter the suspense mode after a predetermined interval of inactivity. Regardless, once the computer is in the suspense mode, the computer will generate a signal so indicating A8, which signal will be sensed A9 by the docking station. The docking station may then advance A10 the docking station connector to engage the connector of the notebook computer, completing the docking station/notebook computer interface.

When the user desires to take advantage of the portability of the notebook computer, the user initiates retraction A11 of the docking station connector from engagement with the connector of the notebook. The computer may then be safely removed or expelled from the receptacle of the docking station to end A12 the docking station's expansion of the computer's capabilities.

Figure 2B:
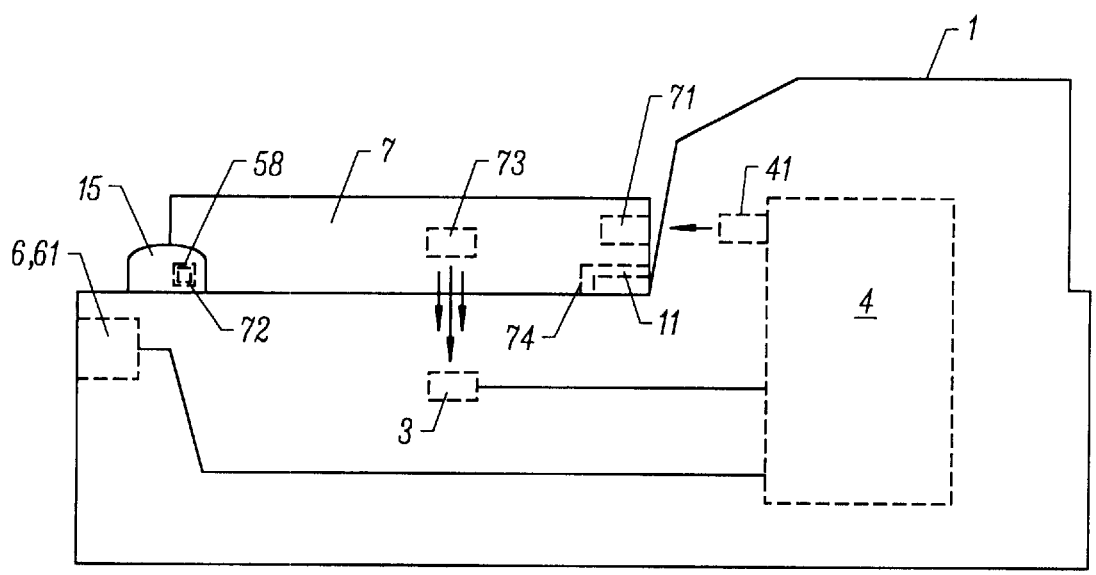
FIG. 2(b) is a schematic side view of the docking station system of FIG. 2(a).
Figure 2C:
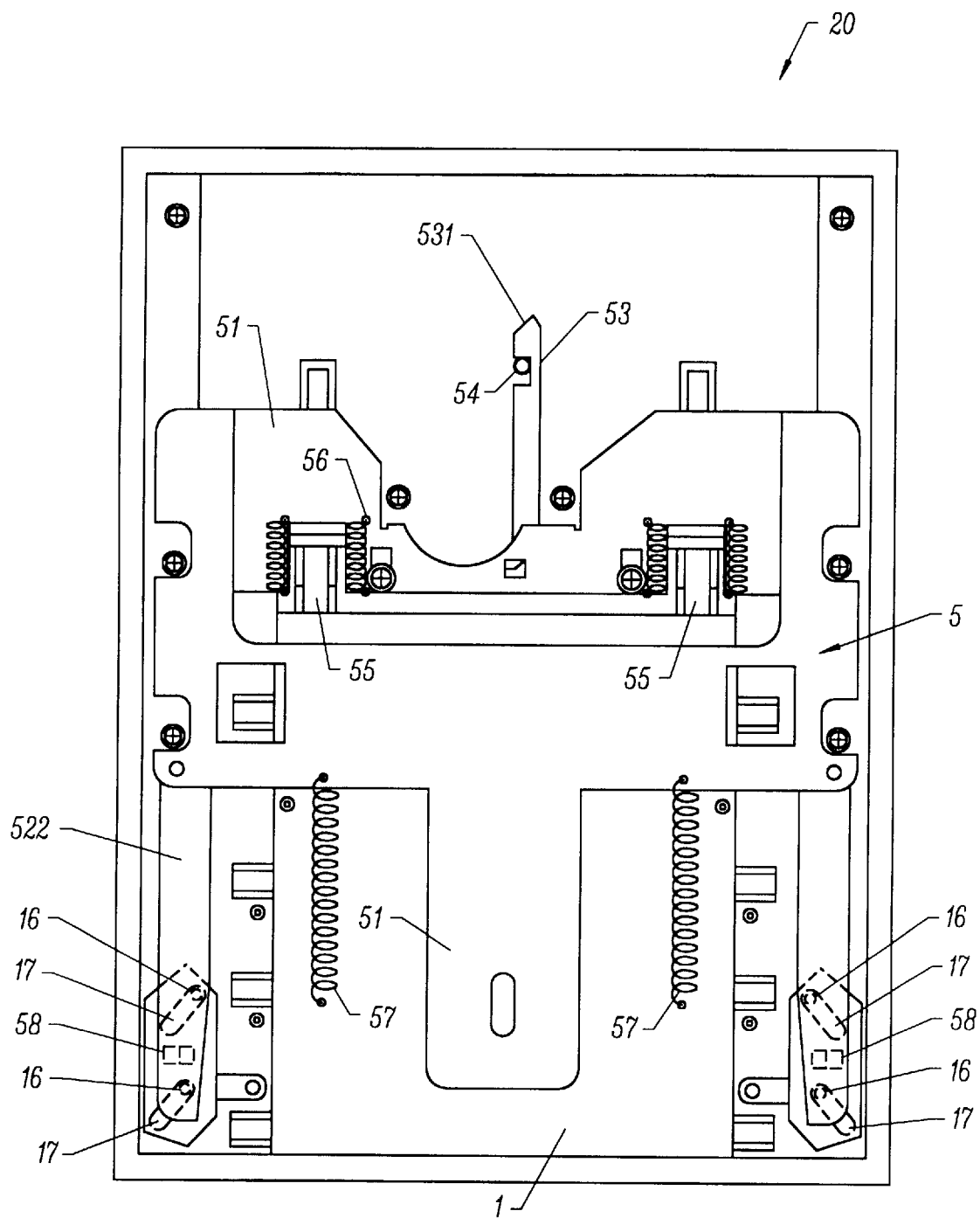
FIG. 2(c) is a bottom view of a docking station showing an exemplary locking mechanism, for use in the docking station system of FIG. 2(a).

Referring now to FIGS. 2(a)–(c), a docking station system 10 includes a docking station 20 and a notebook computer 7 (shown schematically for simplicity). Docking station 20 includes a housing 1 with a computer receptacle 2.

As illustrated, the computer receptacle need not be completely surround computer 7. Docking station 20 further includes a connector drive assembly 4, which is shown enlarged in FIG. 2(a) for clarity of detail, and a locking mechanism 5 (seen best in the bottom view of FIG. 2(c)).

Computer 7 has a computer connector 71 at its rear surface which provides an input/output interface with the expansion boards, memory devices, battery chargers, and other added equipment of the docking station (not shown for simplicity). A contact switch 74 is coupled to an LED 73 so that the LED produces a light signal indicating the operating mode of the computer when switch 74 is engaged. The contact switch is typically a micro switch. Normal operating mode might be indicated with a light signal, while a suspense operating mode might be indicated by no light, or alternatively, these signals might be reversed. Ideally, normal operating mode is indicated by one identifiable signal (such as a high voltage light signal) and suspense is indicated by another identifiable signal (such as a low voltage light signal) to provide the docking station with a positive operation mode indication. Clearly, a wide variety of signalling schemes might be used with LED's, optical signal generators, or other types of signal generators. Holding recesses 72 are disposed on opposite sides of the computer to positively lock the computer in receptacle 2.

Housing 1 generally includes a cover 12 and an associated hollow 13 which facilitate mounting of connector drive assembly 4 therein. Guideblocks 15 ensure alignment of computer 7 and receptacle 2 during loading, and a release switch 6 is easily accessible on the front of the housing.

Loading of computer 7 into receptacle 2 is generally accomplished by aligning the computer between guideblocks 15 with the back surface of the computer against tabs 55. The computer then slides rearward, displacing tabs 55 from receptacle 2. Once tabs 55 are fully displaced, holding arms 58 extend inward to engage the opposed holding recesses 72 of the computer, firmly securing the computer in place.

Housing 1 of docking station 20 further includes a protrusion 11 extending generally into computer receptacle 2, and a signal passage 14 below which a signal receiver 3 is disposed. Contact switch 74 of computer 7 is engaged by protrusion 11 when the computer is loaded into the receptacle, so that LED 73 indicates the operating mode of the computer, as described above. Signal receiver 3, typically comprising a photo-sensor or a photo-emitter sensor, senses this signal so that the docking station advances a docking station connector 41 using connector drive assembly 4 when engagement can be made safely based on the present computer operating mode. The location and shape of signal passage 14 can also help ensure that the computer is properly positioned in the receptacle prior to advancing the connector.

From the above, it is clear that drive assembly 4 is coupled to signal receiver 3. The alignment of docking station connector 41 is maintained by connector holder 42, and the connector is advanced and retracted relative to receptacle 2 by a motor 433 driving a cam 432 through a gearbox 431. Specifically, energizing motor 433 causes the motor to turn gears within gearbox 431 to reposition cam 432. In other words, cam 432 is coupled to gear box 431 and to docking station connector 41 so that the cam translates the connector between the disengaged position and the engaged position. Of course, if signal receiver 3 senses that the computer is in the normal operating mode, motor 433 is generally not energized until the computer changes to another operating mode.

The detailed operation of the locking mechanism is seen most clearly in FIG. 2(c). As the computer is loaded into the receptacle, tabs 55 are displaced. Tabs 55 are mounted on a sliding plate 51, and are biased against the computer by springs 56. As the plate slides, links 521, 522 move from an open position 17 to a locked position 16, thereby extending holding arms 58 inwardly. Additionally, a sliding surface 531 of a latch 53 advances along a pillar 54, until the pillar is caught in the latch. The latch prevents inadvertent release of the computer by holding plate 51, and thus links 521, 522 and holding arms 58, in the locked position. Clearly, similar mechanisms could use a single tab, link, or holding arm within the scope of the present invention.

Releasing computer 7 from docking station 20 is initiated by actuation of release switch 6. This again energizes motor 433 to turn cam 432. During rotation to retract docking station connector 41, cam 432 also engages and unlatches latch 53 from pillar 54 (see also FIG. 2(a)). Plate 51, being biased toward the release position by springs 57, is then free to slide forward, retracting the holding arms. As the computer is not otherwise restrained, springs 56 advance tabs 55 into the receptacle, expelling computer 7 from the docking station.

In summary, the present invention provides a simple, light-weight, easy to use docking station, which avoids the reliability and repairability problems of the complicated, VCR-type loading structures found in the docking stations of the prior art.

While the invention has been described in some detail, for purposes of clarity and understanding, it is to be understood that the invention need not be limited to the specific embodiment shown. On the contrary, the present invention encompasses various modifications and adaptations, and is therefore solely limited by the following claims.

What is claimed is:

1. A computer docking station for use with a computer having a first connector, the docking station comprising:
    a housing having a computer receptacle to hold the computer at a fixed position;
    a second connector movable relative to the fixed computer and to the computer receptacle between a first position and a second position while the computer is disposed in the computer receptacle, the second connector in the first position being disengaged from the first connector when the computer is in the computer receptacle, the second connector in the second position engaging the first connector when the computer is in the computer receptacle.

2. A computer docking station as claimed in claim 1, wherein a drive mechanism linearly translates the second connector between the first position and the second position.

3. A computer docking station for use with a computer having a first connector, the docking station comprising:
    a housing having a computer receptacle;
    a second connector movable relative to the computer receptacle between a first position and a second position, the second connector in the first position being disengaged from the first connector when the computer is in the computer receptacle, the second connector in the second position engaging the first connector when the computer is in the computer receptacle; and
    a connector drive mechanism which translates the second connector between the first position and the second position while the computer is restrained at a fixed position in the receptacle so as to couple and uncouple the docking station with the fixed computer.

4. A computer docking station as claimed in claim 3, further comprising a signal receiver on the housing, the signal receiver capable of sensing at least one of off, a normal operating mode, and a suspense operating mode of the computer.

5. A computer docking station as claimed in claim 4, wherein the signal receiver senses a first operating mode and a second operating mode of the computer as indicated by an LED of the computer, at least one of the first mode and the second mode sensed as a light signal from the LED, and wherein the drive mechanism does not translate the second connector from the first position to the second position while the computer is in the normal operating mode.

6. A computer docking station as claimed in claim 1, further comprising a locking mechanism for securely holding the computer when the computer is manually positioned in the computer receptacle.

7. A computer docking station as claimed in claim 6, wherein the locking mechanism comprises at least one tab which restrainably biases the computer away from the immovable computer receptacle, the at least one tab being resiliently displaceable during manual positioning of the computer.

8. A computer docking station as claimed in claim 7, wherein the locking mechanism further comprises at least one engagement mechanism coupled to the at least one tab so as to releasably restrain the computer once the computer is positioned in the computer receptacle.

9. A computer docking station as claimed in claim 8, wherein the locking mechanism comprises two tabs and two engagement mechanisms coupled together through a sliding plate, a plurality of springs biasing the tabs against the computer during manual positioning, the engagement mechanisms being opposed to hold the computer therebetween once the tabs are fully displaced, and a latch which releasably restrains the plate in a locked position.

10. A computer docking station as claimed in claim 6, further comprising a release mechanism mounted on the housing which effects disengagement of the locking mechanism from the computer.

11. A computer docking station as claimed in claim 10, further comprising a connector drive mechanism which translates the connector between the first position and the second position, and wherein the release mechanism comprises a release switch which energizes the drive mechanism to translate the second connector between the second position and the first position.

12. A computer docking station as claimed in claim 11, wherein the drive mechanism comprises a gear case mounted to the housing, an electrical motor coupled to the gear case, and a cam coupled to the gear case and to the second connector so that the cam translates the second connector between the first position and the second position, and so that the cam translates the second connector between the second position and the first position and unlatches the locking mechanism when the release switch is actuated.

13. A computer docking station as claimed in claim 12, wherein the release mechanism further comprises springs which slide a plate of the locking mechanism from a locked position so that tabs expel the computer from the computer receptacle.

14. A computer docking station as claimed in claim 3, wherein the drive mechanism linearly translates the second connector between the first position and the second position.

15. A computer docking station system comprising:
    a computer including:
        a first connector; and
        an operation mode signal generator which indicates at least one of off, a normal operating mode, and a suspense operating mode of the computer; and
    a docking station including:
        a housing having a computer receptacle which removably receives the computer at a fixed location;
        a locking mechanism which securely holds the computer in the computer receptacle at the fixed location;
        a second connector movable relative to the receptacle between a first position and a second position while the computer is held at the fixed location, the second connector in the first position being disengaged from the first connector when the computer is in the computer receptacle, the second connector in the second position engaging the first connector when the computer is held in the computer receptacle;
        a signal receiver the housing of which is capable of sensing the at least one mode from the signal generator; and
        a drive mechanism coupled to the second connector which translates the second connector between the first position and the second position if the computer is in a mode other than the normal operating mode.

16. A computer docking station system as claimed in claim 15, wherein the signal generator indicates the normal operating mode and the suspense operating mode.

17. A computer docking station system as claimed in claim 16, wherein the signal generator comprises an LED, and wherein the signal receiver comprises a member of a group consisting of a photo-sensor and a photo-emitter sensor, at least one of the normal operating mode and the suspense mode being indicated by a light signal from the LED.

18. A computer docking station as claimed in claim 17, wherein one of the normal operating mode and the suspense mode is indicated by a high voltage light signal from the LED and the other is indicated by a low voltage light signal from the LED relative to the high voltage light signal.

19. A computer docking station as claimed in claim 17, wherein one element selected from a group consisting of the normal operating mode and the suspense mode is indicated by a light signal from the LED and another element of the group is indicated by the absence of a light signal from the LED.

20. A computer docking station system as claimed in claim 16, wherein the receptacle includes a protrusion which engages a signal generator switch on the computer when the computer is in the receptacle.

21. A method for docking a computer comprising:
    loading a computer having a first connector into a computer receptacle of a docking station; and
    restraining the computer at a fixed position in the receptacle;
    translating a second connector of the docking station from a first position clear of the restrained computer to a second position at which the second connector engages the first connector of the restrained computer (without moving the computer).

22. A computer docking method as claimed in claim 21, further comprising sensing an operating mode of the loaded computer with a signal receiver of the docking station prior to translating the second connector.

23. A computer docking method as claimed in claim 22, wherein the translating step occurs after the signal receiver senses that the computer is in a suspense mode.

24. A computer docking method as claimed in claim 22, wherein the translating step occurs after the computer changes from a normal operating mode.

25. A computer docking method as claimed in claim 22, wherein an LED of the computer indicates the operating mode when a protrusion on the docking station engages an indicator switch of the computer, and wherein the sensing step comprises detecting light from the LED with a photo-sensor or a photo-emitter sensor on the docking station adjacent to the LED.

26. A computer docking method as claimed in claim 21, wherein the loading step comprises manually positioning the computer in the receptacle and holding the positioned computer in the computer receptacle with a locking mechanism of the docking station, and wherein the translating step comprises energizing a drive mechanism.

27. A computer docking method as claimed in claim 26, wherein the loading step further comprises displacing a tab from the computer receptacle with the computer, the locking mechanism being actuated by the tab.

28. A computer docking method as claimed in claim 26, further comprising releasing the computer from the computer receptacle by actuating the drive mechanism to translate the second connector from the second position to the first position at which the second connector is disengaged from the first connector, the drive mechanism also unlatching the locking mechanism.

29. A computer docking station for use with a computer having a first connector, the docking station comprising:
    a housing having a computer receptacle, the receptacle capable of holding the computer in a fixed position;
    a second connector movable relative to the receptacle and the housing between a first position and a second position while the computer is held in the fixed position by the receptacle, the second connector in the first position being disengaged from the first connector when the computer is held in the fixed position by the computer receptacle, the second connector in the second position engaging the first connector when the computer is held in the fixed position by the computer receptacle.

30. A computer docking station system comprising:
    a computer including:
        a first connector; and
        an operation mode signal generator which indicates at least one of off, a normal operating mode, and a suspense operating mode of the computer; and
    a docking station including:
        a housing having a computer receptacle which removably receives the computer;

a locking mechanism which securely holds the computer in the computer receptacle;

a second connector movable relative to the receptacle and the computer when the computer is held at a fixed position within the computer receptacle, the second connector movable between a first position and a second position, the second connector in the first position being disengaged from the first connector when the computer is in the computer receptacle, the second connector in the second position engaging the first connector when the computer is held in the computer receptacle;

a signal receiver supported by the housing which is capable of sensing the at least one mode from the signal generator; and a drive mechanism coupled to the second connector which translates the connector between the first position and the second position if the computer is in a mode other than the normal operating mode.

31. A method for docking a computer comprising:

loading a computer having a first connector into a computer receptacle of a docking station so that the computer is at a loaded position; and translating a second connector of the docking station from a first position to a second position after the computer is at the loaded position, the second connector being disengaged from the loaded computer at the first position, the second connector engaging the first connector of the computer at the second position.

32. A computer docking station for use with a computer having a first connector, the docking station comprising:

a housing having a computer receptacle to hold a computer at a fixed position;

a locking mechanism for securely holding a computer when a computer is positioned in the computer receptacle;

a release mechanism having a release switch and mounted on the housing for effecting disengagement of the locking mechanism from a computer;

a second connector movable relative to a fixed computer and to the computer receptacle between a first position and a second position, the second connector in the first position being disengaged from a first connector of a computer when a computer is in the computer receptacle, the second connector in the second position engaging a first connector of a computer when a computer is in the computer receptacle; and a connector drive mechanism coupled to the second connector for translating the second connector between the first position and the second position and including a gear case mounted to the housing, an electrical motor coupled to the gear case, and a cam coupled to the gear case and to the second connector.

33. A computer docking station as claimed in claim 32, wherein said cam assists in translating the second connector between the first position and the second position.

34. A computer docking station comprising:

a housing having a computer receptacle to hold a computer; and a connector assembly driven by a motor linearly between a first position for engaging a computer in the computer receptacle and a second position for disengaging a computer in the computer receptacle.

35. The computer docking station of claim 34 wherein said computer receptacle is immovable.

36. A computer docking assembly comprising:

a housing having an immovable computer receptacle;

a computer stationarily disposed in the immovable computer receptacle and including a first connector; and a second connector linearly movable relative to the stationary computer and to the immovable computer receptacle between a first position and a second position, the second connector in the first position being disengaged from the first connector of the computer in the immovable computer receptacle, and the second connector in the second position engaging the first connector of the computer in the computer receptacle.

* * * * *